United States Patent
Watt et al.

(10) Patent No.: US 10,990,507 B2
(45) Date of Patent: Apr. 27, 2021

(54) SYSTEM AND METHOD FOR PROVISIONING A VIRTUAL MACHINE TEST ENVIRONMENT

(71) Applicant: DELL PRODUCTS, LP, Round Rock, TX (US)

(72) Inventors: James S. Watt, Austin, TX (US); Douglas Braga de Alencar, Carlow (IE)

(73) Assignee: Dell Products L.P., Round Rock, TX (US)

( * ) Notice: Subject to any disclaimer, the term of this patent is extended or adjusted under 35 U.S.C. 154(b) by 154 days.

(21) Appl. No.: 15/668,274

(22) Filed: Aug. 3, 2017

(65) Prior Publication Data

US 2017/0329698 A1 Nov. 16, 2017

Related U.S. Application Data

(63) Continuation-in-part of application No. 15/053,509, filed on Feb. 25, 2016, and a continuation-in-part of application No. 15/053,540, filed on Feb. 25, 2016, now Pat. No. 10,146,664.

(51) Int. Cl.
| | |
|---|---|
| *G06F 11/36* | (2006.01) |
| *G06F 9/455* | (2018.01) |
| *G06F 16/958* | (2019.01) |
| *G06F 11/34* | (2006.01) |

(52) U.S. Cl.
CPC ...... *G06F 11/3664* (2013.01); *G06F 9/45558* (2013.01); *G06F 11/368* (2013.01); *G06F 11/3688* (2013.01); *G06F 16/958* (2019.01); *G06F 11/3466* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 7,627,813 | B2 | 12/2009 | Roser |
| 7,823,057 | B1 | 10/2010 | Schultz et al. |
| 9,031,995 | B1 | 5/2015 | Raden, II et al. |
| 9,094,302 | B2 | 7/2015 | Nguyen et al. |
| 9,141,381 | B2 | 9/2015 | Siddegowda |
| 9,407,658 | B1 * | 8/2016 | Kuskov ............... H04L 63/1425 |

(Continued)

OTHER PUBLICATIONS

"Use Snapshots to Migrate Instances," OpenStack Documentation, Jul. 7, 2017, pp. 1-5; https://bugs.launchpad.net/openstack-manuals/+filebug?field.title=Use%snapshots%20to%20migrate%20instances%20in%20End%20User%20Guide.

(Continued)

*Primary Examiner* — Wynuel S Aquino
(74) *Attorney, Agent, or Firm* — Larson Newman, LLP

(57) ABSTRACT

A system for testing changes to a website includes a hypervisor that instantiates a first virtual machine, from a first snapshot stored in a repository, as a first environment node in a test environment. The hypervisor applies scripts to configure the first virtual machine to test a first proposed webpage of the website. If the test is successful, then a second snapshot of the first virtual machine as configured is stored in the repository. The hypervisor may then instantiate a second virtual machine from the second snapshot, and configure the second virtual machine to test a second webpage of the website.

19 Claims, 13 Drawing Sheets

(56) References Cited

U.S. PATENT DOCUMENTS

| | | |
|---|---|---|
| 2005/0188361 A1 | 8/2005 | Cai et al. |
| 2006/0184937 A1 | 8/2006 | Abels et al. |
| 2006/0218544 A1 | 9/2006 | Chakraborty et al. |
| 2006/0225065 A1 | 10/2006 | Chandhok et al. |
| 2007/0089111 A1 | 4/2007 | Robinson et al. |
| 2008/0109804 A1 | 5/2008 | Bloomstein et al. |
| 2008/0134177 A1* | 6/2008 | Fitzgerald ............... G06F 21/51 718/1 |
| 2008/0184225 A1 | 7/2008 | Fitzgerald et al. |
| 2008/0125796 A1 | 9/2008 | Lam et al. |
| 2009/0100420 A1* | 4/2009 | Sapuntzakis ............. G06F 8/65 717/171 |
| 2009/0300607 A1 | 12/2009 | Ferris et al. |
| 2010/0157989 A1* | 6/2010 | Krzyzanowski ........ G06F 9/452 370/352 |
| 2010/0318894 A1 | 12/2010 | Billharz et al. |
| 2011/0145694 A1 | 6/2011 | Graves et al. |
| 2012/0110574 A1* | 5/2012 | Kumar ................ G06F 9/45558 718/1 |
| 2013/0174117 A1* | 7/2013 | Watters ............... G06F 11/3664 717/106 |
| 2014/0059545 A1* | 2/2014 | Flake .................. G06F 9/45533 718/1 |
| 2014/0129924 A1 | 5/2014 | Le Bescond De Coatpont |
| 2014/0213344 A1* | 7/2014 | Rose ...................... G06Q 20/12 463/25 |
| 2015/0120880 A1 | 4/2015 | Du Laurent et al. |
| 2016/0034295 A1* | 2/2016 | Cochran ............. G06F 9/45558 718/1 |
| 2016/0147641 A1* | 5/2016 | Malla .................. G06F 11/3692 717/125 |
| 2016/0371107 A1 | 12/2016 | Puthillathe et al. |

OTHER PUBLICATIONS

"Amazon Machine Images (AMI)," Amazon Elastic Compute Cloud User Guide for Linux Instances, Jan. 5, 2015, pp. 76-77, http://docs.aws.amazon.com/AWSEC2/latest/UserGuide/AMIs.html.

* cited by examiner

SYSTEM AND METHOD FOR PROVISIONING A VIRTUAL MACHINE TEST ENVIRONMENT

CROSS-REFERENCE TO RELATED APPLICATION

This application claims priority under 35 U.S.C. § 120 to U.S. patent application Ser. No. 15/053,509 entitled "Dynamic Virtual Testing Environment for Webpages," filed on Feb. 25, 2016, and to U.S. patent application Ser. No. 15/053,540 entitled "Virtual Test Environment for Webpages with Automation Features," filed on Feb. 25, 2016, the disclosures of which are hereby expressly incorporated by reference in their entirety.

FIELD OF THE DISCLOSURE

The present disclosure generally relates to information handling systems, and more particularly relates to provisioning of virtual machines in a test environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

A system for testing changes to a website includes a hypervisor that instantiates a first virtual machine, from a first snapshot stored in a repository, as a first environment node in a test environment. The hypervisor applies scripts to configure the first virtual machine to test a first proposed webpage of the website. If the test is successful, then a second snapshot of the first virtual machine as configured is stored in the repository. The hypervisor may then instantiate a second virtual machine from the second snapshot, and configure the second virtual machine to test a second webpage of the website.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
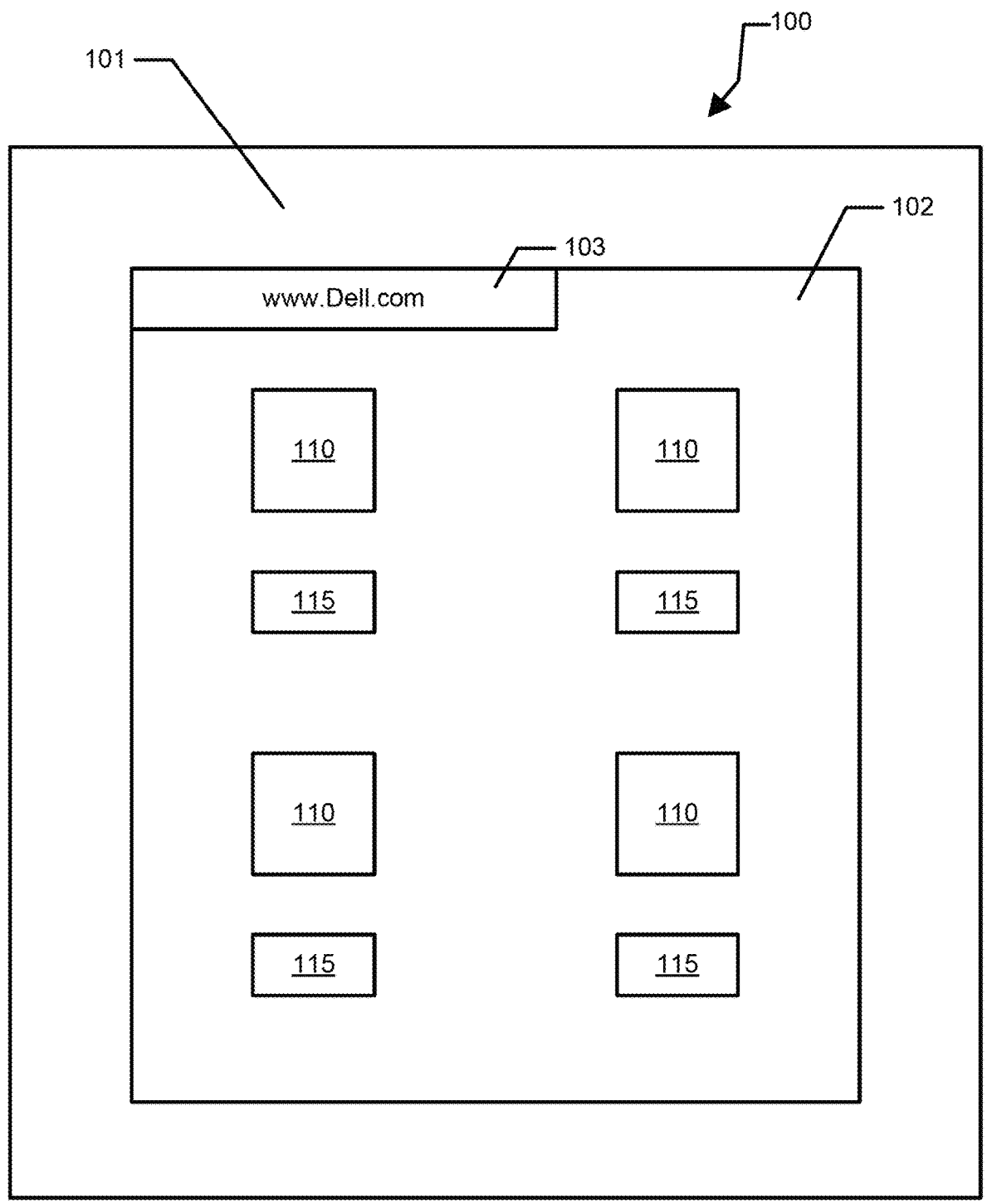
FIG. 1 is a diagrammatic representation of a web environment.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

A website may be generally considered to be a web environment hosting webpages and providing communication channels between web browsers operated by users and backend servers responsible for directing information to entities for use by the entities. Thus a web environment supports webpages and communications. Webpages may provide links to other webpages, media, such as pictures or writing, and other components generally which make up the webpage. Within a web environment, webpages and the components making up webpages may be considered to be deployment components which are deployed on a website to make up the website.

Testing the correctness of deployment components is a significant challenge due to the inherent inter-relation among components when deployed. In a very simple example, on a webpage offering a computer notebook for sale, testing components requires determining if the picture component correctly corresponds to the product number component and if the purchase hyperlink component directs to a component that allows for purchase of a product accurately defined by the product number. To try to ensure correct webpages, components of webpages and links between webpages, website developers have resorted to long test cycles and stability windows in which webpage changes are frozen. Furthermore test and hosting environments exist in separate spaces: for example, a webpage development team may test webpages by reviewing the code for the webpages and viewing the webpages, prior to deploying the webpages for hosting. Thus, there is only an approximation of the correct relations between the deployed components prior to deployment, such that upon deployment it may be discovered that there are errors in the interrelations and dependencies among deployed components-manifested in the webpage errors users often experience when browsing a website.

According to embodiments disclosed herein, to test deployment components such as webpages and components of webpages may be tested prior to webpage deployment via a virtual test environment. The virtual test environment may include a representation of components associated with a webpage. For example, a virtual test environment may provide virtual connections for a webpage under test based on the component links of the webpage so that the validity of the links on the webpage may be tested in the virtual test environment. A repository of the virtual test environment may maintain information on webpages associated with the virtual connections of the webpage under test so that the virtual test environment associates updated webpages with the respective hyperlinks of the webpage under test to allow for test of how the webpage under test will interface with associated webpages.

FIG. 1 shows a web environment 100 that includes website 101 having a webpage 102. Webpage 102 includes a webpage address 103, media components 110, and hyperlink components 115 associated with the respective media component. Hyperlink components 115 link webpage 102 to other webpages.

Figure 2:
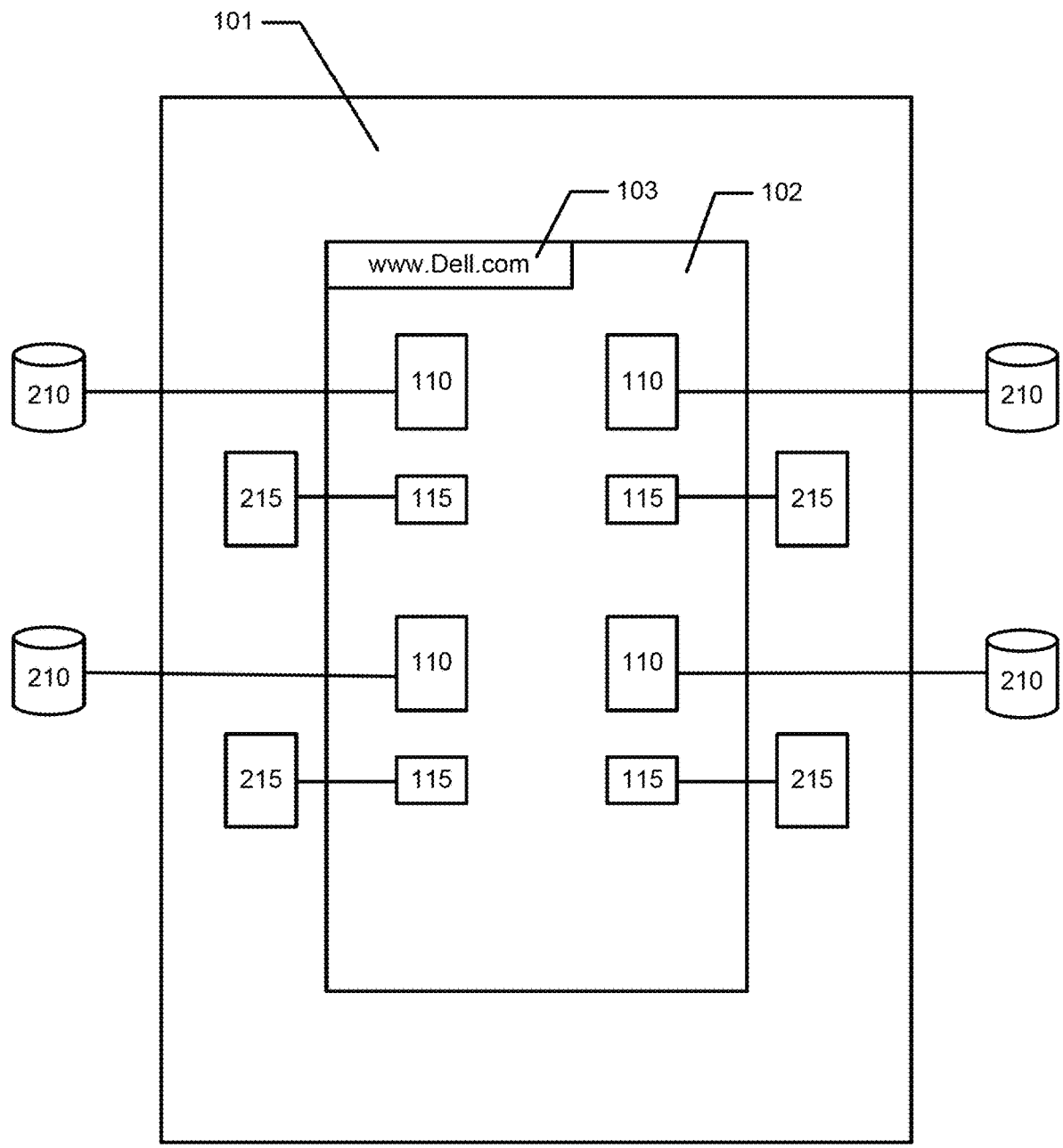
FIG. 2 is a diagrammatic representation of a website.

FIG. 2 shows media components 110 that may be provided to webpage 102 by media component repositories 210, which may be the same or different repositories. Hyperlink components 115 link to other webpages 215 of website 101.

Figure 3:
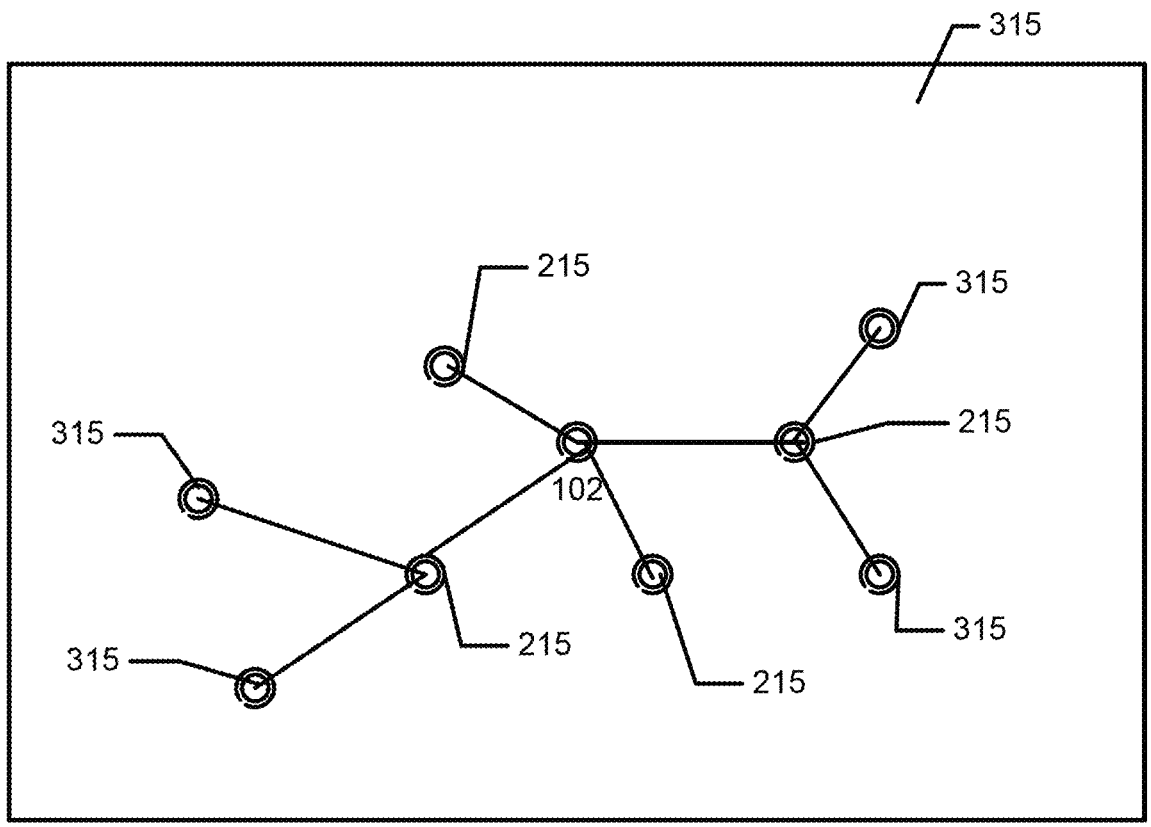
FIG. 3 is a diagrammatic representation of relationships between webpages.

FIG. 3 shows relationships or links between webpages of website 101. Webpage 102 links to webpages 215, and some of webpages 215 in turn have hyperlinks to webpages 315, which may also have hyperlinks to other webpages. Each of webpages 102, 215, and 315 may communicate with one or more servers hosting website 101, and content may be provided to webpages 102, 215, and 315 from the servers or from one or more databases or other repositories.

Webpage 102 includes link components directly linking webpages 215. Thus, webpage 102 is directly linked or connected to webpages 215 with hyperlink components. Webpage 102 is indirectly linked to webpages 315 via webpages 215 and the connections between webpage 102 and webpages 215, and the connections between webpages 215 and webpages 315. For purposes of testing webpages, a test environment may test webpages by testing the direct links between webpages. Thus, a webpage under test can be tested with regard to webpages in direct connection to the webpage under test. That is, a webpage under test may only need to be tested against webpages referenced by link components of the webpage to test the correctness of the webpage.

A representation of a webpage such as webpages 102, 215, and 315 may be stored in a repository as a template. Such a template may be a template including html code defining the particular webpage associated with the particular template. The template may further define an application, operating system, and configuration associated with the webpage. The template may be versioned with different versions in a template library of the repository.

Figure 4:
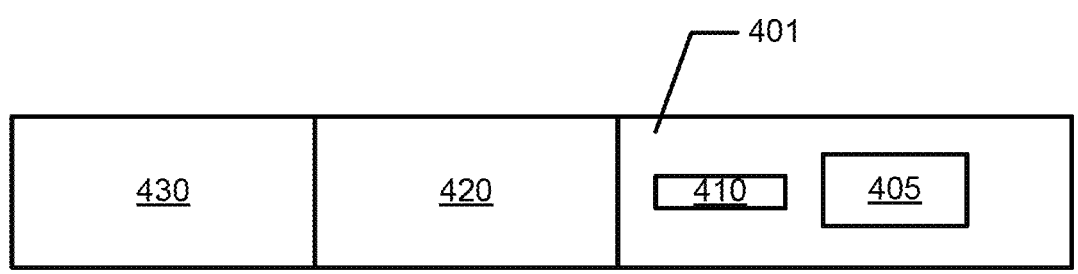
FIG. 4 is a diagrammatic representation of an example template representing a webpage.

FIG. 4 shows a template 401 representing a webpage such as webpage 102. Template 401 includes application information 410, configuration information 420, and operating system information 430. A template such as template 401 may be stored in a repository for each webpage of a website. The template may be versioned, and there may be triggers which indicate changes to the templates when a template is stored in the repository or updated. Application information 410 may include webpage information 405. Webpage information 405 may include information defining a specific webpage, such as media components, hyperlink components, and other components, for example.

A test environment accessing the repository of webpage templates may allow a user to test a webpage by retrieving the content and templates representing webpages directly associated with the webpage under test, virtually instantiating the content and webpages, and allowing a webpage developer to virtually test the functionality of the webpage under test with other webpages in the virtual test environment. More particularly, in the virtual test environment, a representation of a webpage under test may be instantiated from the template representing the webpage under test stored in a repository. Similarly, webpages referenced by link components of the webpage under test may be instantiated from respective templates stored in the repository.

Figure 5:
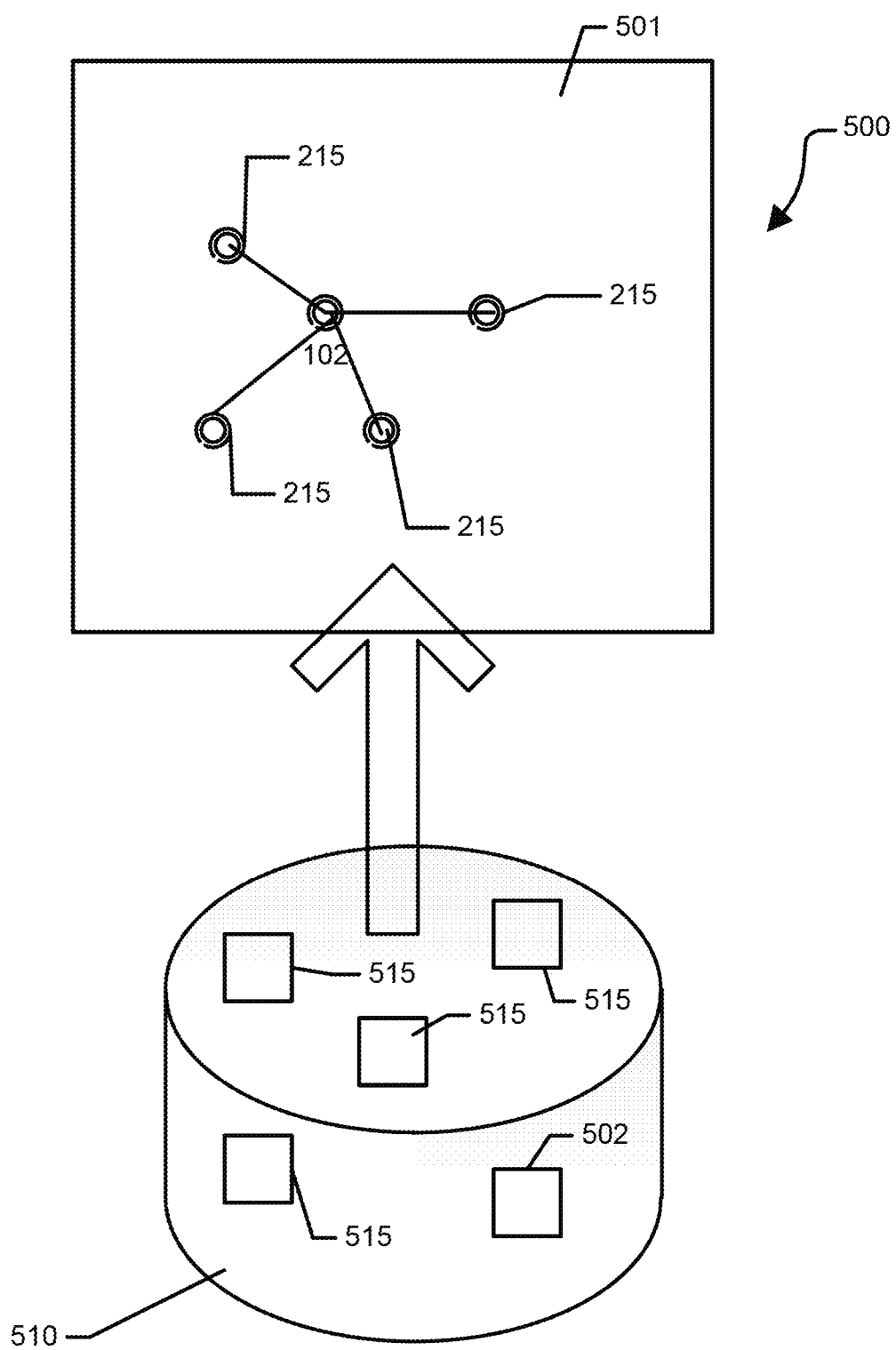
FIG. 5 is a diagrammatic representation of an example of a test environment.

FIG. 5 shows a test environment 500 based on the example provided in FIG. 3. As shown, test environment 500 is configured to test webpage 102 and includes test bench 501 and repository 510, or access thereto. To this end of testing webpage 102, as shown in test bench 501, webpage 102 is tested in the context of webpages 215 directly referenced by the hyperlinks of webpage 102, as shown. Repository 510 contains templates representing webpages: templates 515 represent webpages 215, while template 502 represents webpage 102.

A web designer may develop or test webpage 102 in test environment 500. Webpage 102 is instantiated from template 502. Webpages 215 associated with test webpage 102 are instantiated from templates 515, and the web developer can determine if webpage 102 functions as desired in the context of webpages 215.

Once an update or change is made to a webpage, for example webpage 102, the update or change may be propagated to repository 510 by updating or changing a template associated with the webpage, for example, webpage 502. Thus, repository 510 is dynamically updated with the current states and configurations of webpages upon a change or update to the webpage by updating the respective template. This allows for webpages to be accurately tested against each other using webpages instantiated from templates in repository 510.

Test environment 500 may be implemented by one or more virtual machines provisioned on a virtual infrastructure. For example, a virtual machine may host the webpage under test, a virtual machine may manage the repository, and a further virtual machine may manage components of webpages. Furthermore, virtual machines may be used to host the webpages interfacing with the webpage under test.

Because repository 510 is dynamically updated with regard to webpage changes and maintains a library of templates representing webpages, a webpage may be virtually tested against other webpages referenced by the hyperlink components of the webpage, thereby allowing for test of the webpage prior to deployment of the webpage to the web environment hosting the webpage. Webpages deployed to the web environment for hosting may have corresponding representations thereof, such as template 401 of FIG. 4, stored in the repository and may be used to test other webpages prior to deployment of those webpages. Thus, changes to webpages may be dynamically propagated to the repository such that webpages may be accurately developed and tested against dynamically updated webpage templates stored in the repository.

Figure 6:
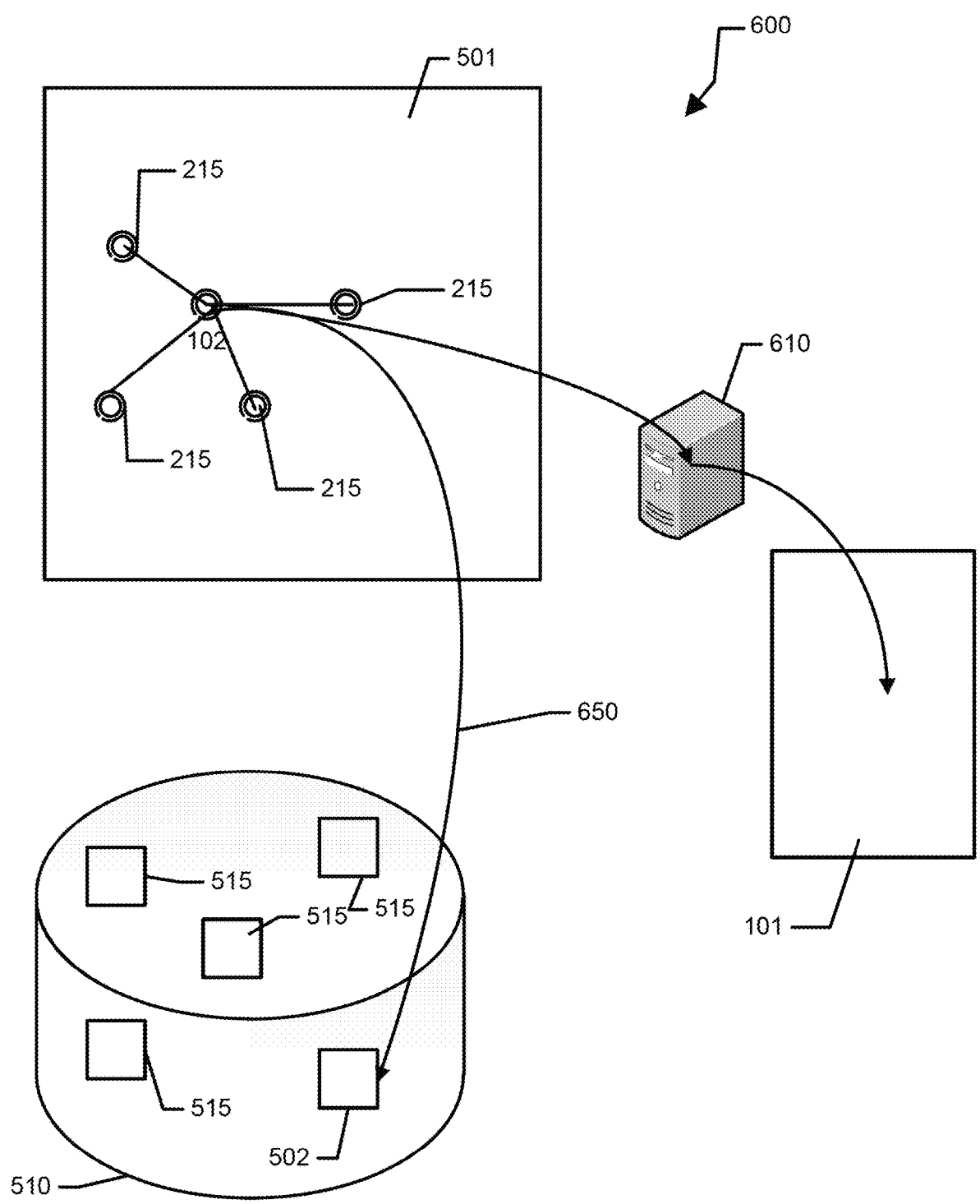
FIG. 6 is a diagrammatic representation of an example of a test and deployment environment.

FIG. 6 shows a test and deployment environment 600. Test and deployment environment 600 includes test bench 501 and repository 510, or access thereto. Test and deployment environment 600 further includes a proxy 610 coupling test bench 501 to website 101 from FIG. 1. A webpage may be deployed from test bench 501 to be hosted on website 101 via proxy 610. Once the webpage has been deployed for access by internet browsers onto the website, then the corresponding template in repository 510 may be updated with the information of the deployed webpage such that repository 510 maintains templates accurately representing deployed webpages, so that webpages may be tested using webpages correctly corresponding to deployed webpages.

More particularly, as shown in 600 and discussed above with regard to FIG. 5, webpage 102 is instantiated from template 502 and is being tested against webpages 215, instantiated from templates 515. Once web page 102 has been virtually tested with test bench 501, and deployed to website 101 via proxy 610 (as shown by the associated directional arrows), template 502 may be updated in repository 510 with any changes to webpage 102, as shown by update arrow 650. Thus, template 502 will be an updated representation of webpage 102 as deployed to a web environment, and may be used in test bench 501 to test other webpages, such as webpages 215, which have direct links to webpage 102 represented by template 502 in repository 510.

As further illustrated in environment 600, test bench 501 as well as repository 510 are isolated from website 101 by proxy 610; thus webpages are virtually tested and developed in isolation from deployment. Thus, developing and testing webpages with embodiments described herein avoids interfering with an operational website during development and test of webpages.

Figure 7:
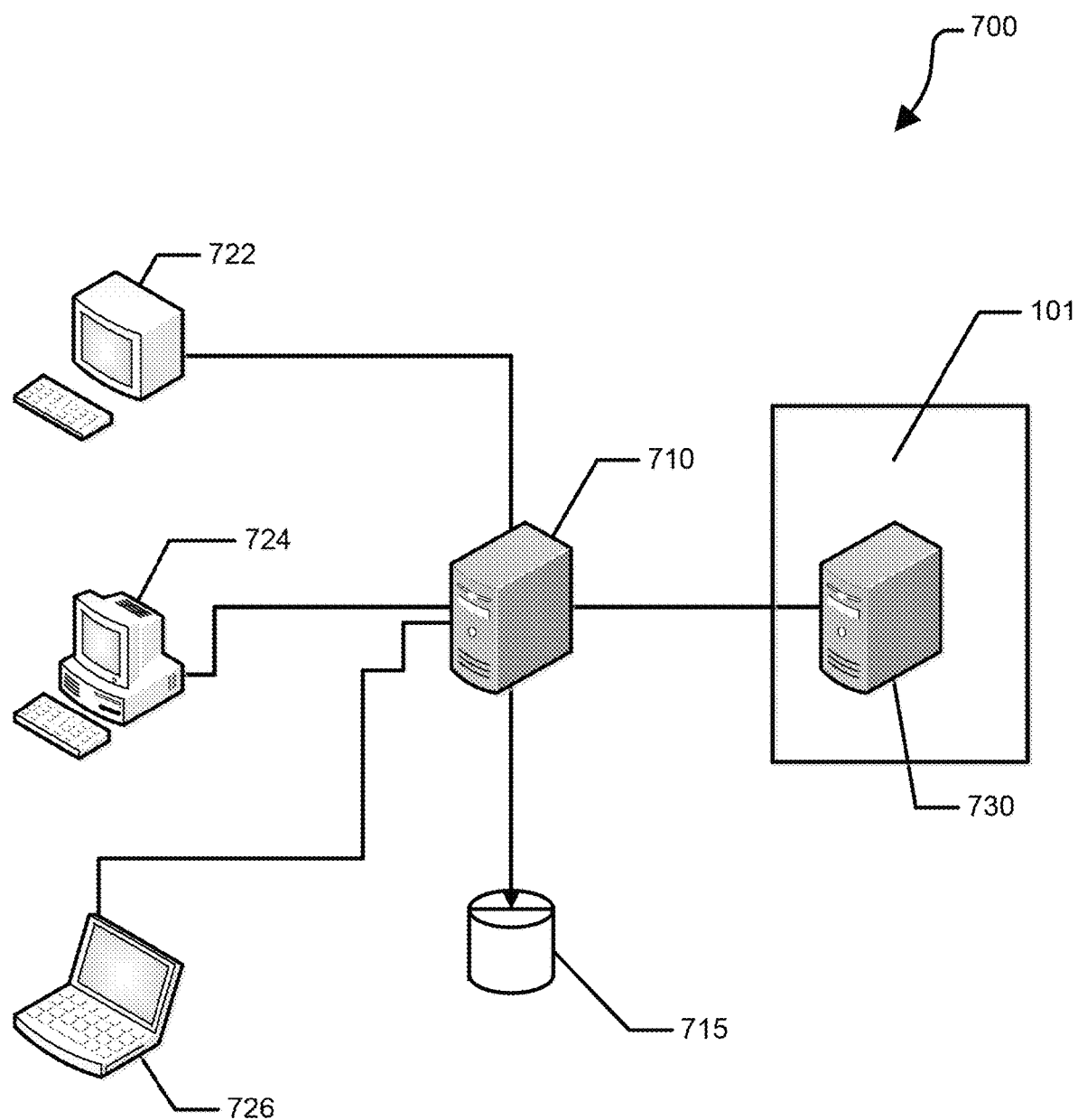
FIG. 7 is a diagrammatic representation of an example of a computer system operable to host a test environment.

FIG. 7 shows a computer system 700 that may be used to implement the test system described herein. Server 710 may host the virtual test environment as described herein, including a virtual test bench. Server 710 is in communication with repository 715 which stores templates representing webpages as described herein. Server 710 may access these stored templates in repository 715 and instantiate corresponding virtual webpages in a virtual test environment, as described herein. Developer computers 722, 724, and 726 are in communication with server 710 and may be operated by webpage developers to test and develop webpages in the virtual test environment hosted by server 710.

Server 710 is further in communication with server 730. As shown, server 730 hosts website 101 of FIGS. 1, 2, and 6. One or more of developer computers 722, 724, and 726 may indicate to server 710 that a webpage should be deployed to server 730 to be hosted as a webpage of website 101 hosted by server 730. Server 710 may then deploy a webpage to server 730 for hosting as part of website 101. Server 710 may further update a template in repository 715 from which the deployed webpage was instantiated. Server 710 may update the template with new or changed properties of the deployed webpage such that the associated template in the repository reflects the properties of the deployed webpage.

Repository 715 may contain a library of templates, each template associated with a respective webpage of a website. The templates may be versioned, and a set of versioned templates may be associated with a webpage, such that the library tracks changes to webpages. Furthermore, the test environment described herein may have check-in-triggers such that when a webpage is checked-in to the test environment by a developer, any changes to the webpage are propagated to the repository library as changes to the respective template, such that the repository maintains a dynamically updated library of templates representing deployed webpages. Dynamically updating the templates in the repository allows for real-time updates to the templates so that the templates accurately represent deployed webpages.

Versioning templates to maintain a historical record of webpages allows for the test environment to provide historical webpage data. Furthermore, versioning of templates allows historical webpage configurations to be recreated. An advantage of the test environment as described herein is that a webpage may be comprehensively tested in the context of a website prior to deploying the webpage to the website. By testing a webpage in isolation from the web environment to host the webpage, webpage failure in the context of the web environment may be avoided. That is, since the functionality of the webpage is confirmed prior to deployment to a website, deployment of the webpage will not cause the active website to fail. Furthermore, the virtual test environment described herein allows for a webpage to be tested against different web environments prior to deployment to one or more of the web environments.

Figure 8:
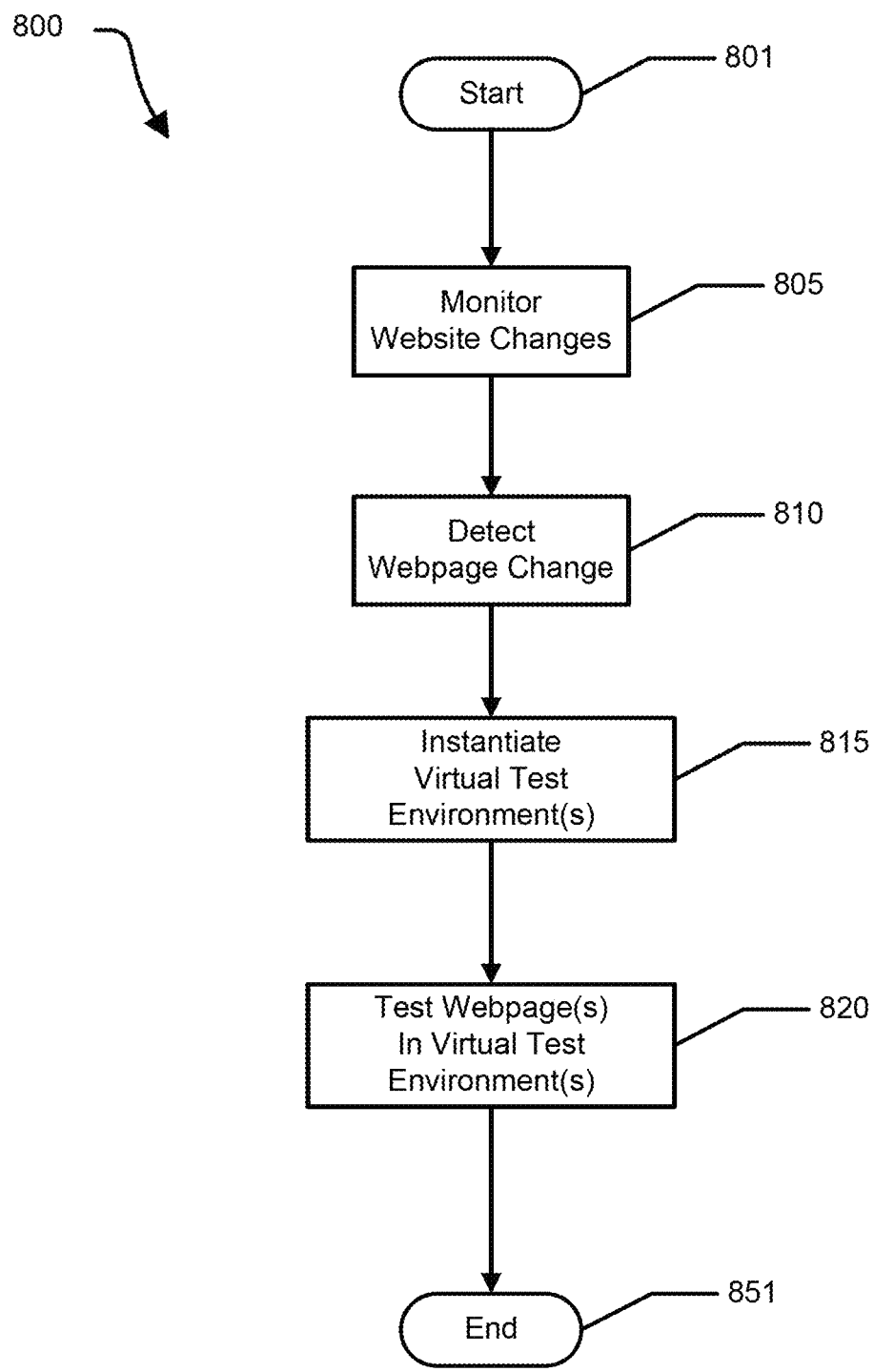
FIG. 8 is a flowchart of an example method for detecting webpage changes.

FIG. 8 shows an example method 800 for detecting webpage changes and instantiating virtual test environments in response. At 801, the method begins. At 805, the monitoring component monitors website changes. For example, the monitoring component may monitor for changes propagated to webpages of a website, or may monitor templates representing webpages in a repository for changes. At 810, a webpage change is detected. The webpage change may have been propagated to the associated website, or may be a change made to a template representing a webpage which may indicate a future webpage change. At 815, in response to detection of a webpage change by the monitoring component, virtual test environments are instantiated for one or more webpages affected by the webpage change. The virtual test environments may be populated with webpages based on templates stored in a repository as discussed above. At 820, the webpages in the virtual test environments are tested as discussed above. Then at 851, the method ends.

Thus, a set of virtual test environments will exist for each detected webpage change. This allows for the number of virtual test environments to grow or shrink dynamically in proportion to the number of webpage changes detected by the monitoring component and allows for webpages to be tested in parallel across multiple virtual test environments.

A library of templates representing webpages may comprise similar templates and these templates may not only represent webpages, but also versions of webpages. If templates specify the entirety of a webpage configuration, the data overhead required for the templates will be relatively high and rise in proportion to the size of the website being tested and the volume of testing carried out with regard to webpages of the website. For example, if an update is generally applied to webpages of a website, the individual templates in a template library will generally have to be individually updated in the library. Furthermore, the need to individually update templates may result in the updates not being propagated to one or more templates, such that those un-updated templates may not be used to accurately test webpages.

To reduce template overhead, templates may be instantiated in the repository based on one or more base templates. Templates representing individual webpages may be generated from the one or more base templates. Changes common to all webpages may be made to the base templates, such that individual templates representing individual webpages will include the general parameters of the base templates. Implementing changes to templates via one or more base templates ensures that the templates have the parameters of the base templates, such that changes may be propagated throughout templates in a template library by modifying the base templates with the desired changes. Furthermore, use of base templates allows for templates to be updated in a one to many fashion, where the modification of one base template propagates the modification to templates derived from the base template, thereby ensuring that the templates in the template library are updated with updates.

Figure 9:
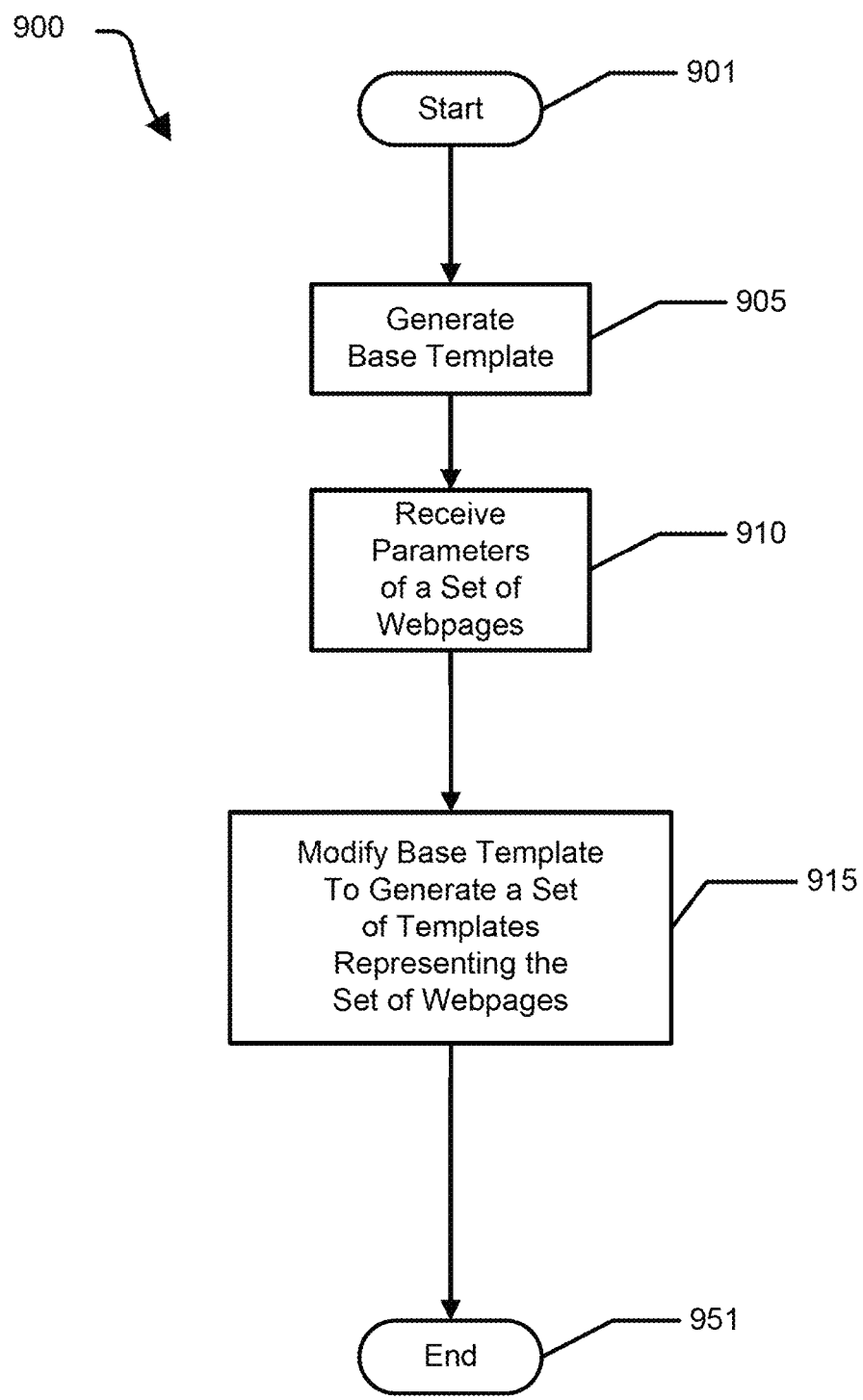
FIG. 9 is a flowchart of an example method for populating a library of templates.

FIG. 9 shows an example method 900 for populating a library of templates representing webpages. At 901 the method begins. At 905, a base template is generated. The base template may comprise parameters common to webpages of a website, such as a web browser compatibility or other parameters. At 910, parameters of a set of webpages are received. At 915, the base template is modified for each web page to generate a set of templates representing the set of web pages. That is, a template is generated from the base template for each webpage and modified to accurately represent the parameters of the corresponding webpage such that there is a set of templates representing the set of webpages generated from the base template. Furthermore, in embodiments, changes to a base template may be propagated to webpages derived from the base template. Thus, a change to a base template will be propagated to templates generated from the base template such that templates may be updated in a one to many fashion, where a change to a base template is propagated to templates representing individual webpages.

Tracking templates and the associations and names of individual templates may be challenging. For example, if template names are reused for different templates, confusion between templates and associations of templates may arise such that templates do not accurately represent webpages of a website.

A centralized server may coordinate naming of templates and the provisioning of virtual test environments. The server tracks templates and instantiations of virtual test environments. The server may further be configured to regulate template generation. For example, server 710 in conjunction with repository 715 may track and maintain templates in the template library of repository 715. Server 710 may further track instantiations of virtual test environments. Server 710 may track and record a history of instantiated virtual test environments. Server 710 may further version templates stored in repository 715 with version numbers. Server 710 may control naming of templates such that template names are not duplicative, and may update metadata associated with templates and virtual test environments.

Generation and maintenance of templates representing webpages in a repository requires generating and maintaining templates which may be a specialized task requiring personal training and further, possible human error in correctly generating templates may produce templates which do not accurately represent webpages and thus which cannot be used to correctly verify webpages.

A template generator may be used to generate templates from webpage source code, thereby mitigating the need for human users to generate templates. The template generator may further be configured to update templates based on webpage changes, thereby mitigating the need for human user to update templates.

Referring to FIG. 7, server 710 may comprise a template generator that may generate and update templates based on webpage source code. The template generator may store the generated templates in the template library of repository 715. Furthermore, the template generator may access the template library of repository 715 and update templates in the template library based on webpage changes to webpages represented by templates in the template library. Developers operating developer computers 722, 724, and 726 may make webpage source code available to the template generator upon propagating webpages to website 101. The template generator may then parse the webpage source code to develop templates representing new webpages and may parse the webpage source code to update templates in the repository when a template in the repository exists that represents a webpage provided by a developer computer 722, 724, or 726. Metadata associated with webpages may be used by the template generator to facilitate parsing webpages and correlating webpage changes with templates.

Figure 10:
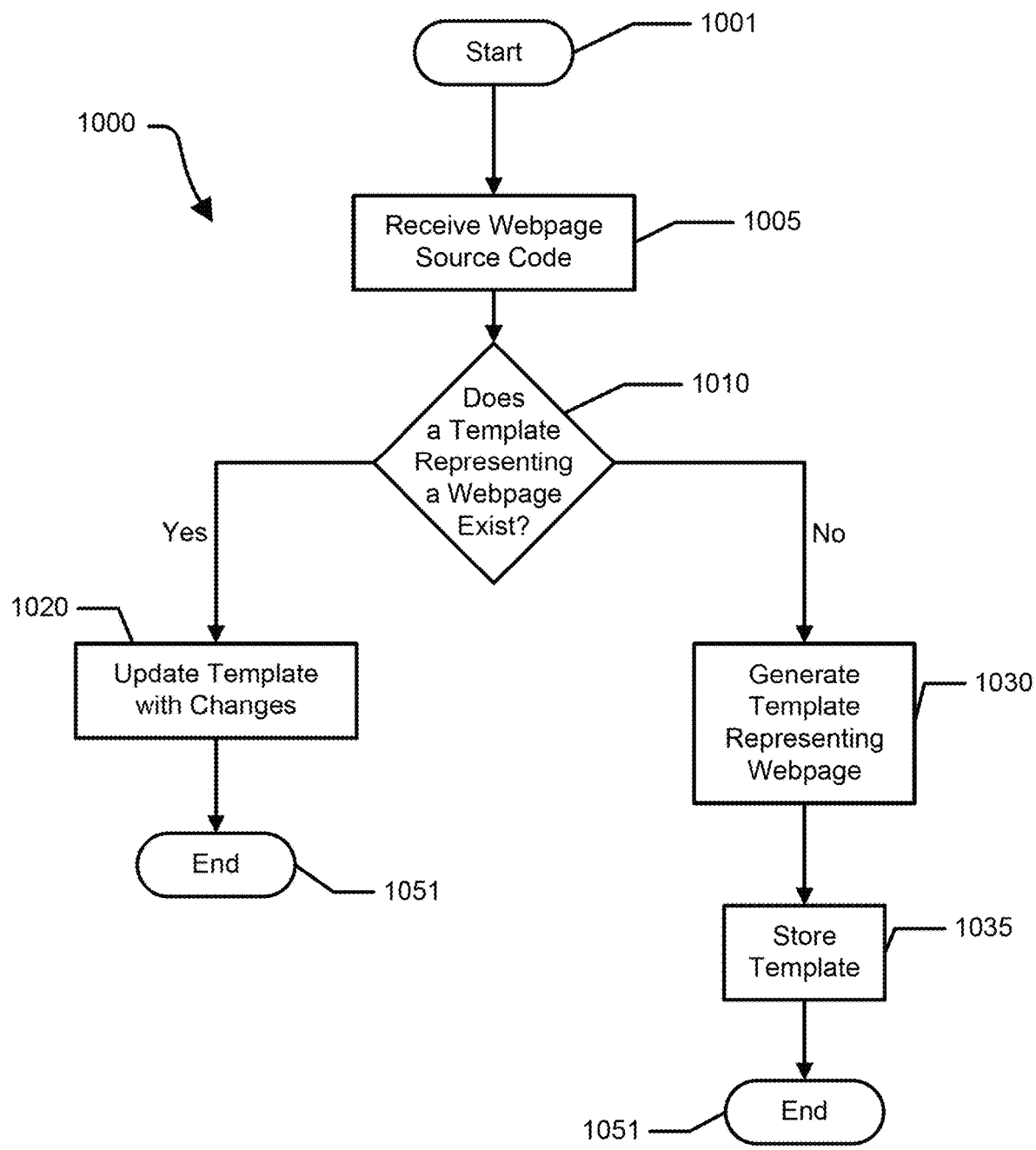
FIG. 10 is a flowchart of an example method for generating and updating templates.

FIG. 10 shows an example method 1000 for generating and updating templates representing webpages for use in a virtual test environment testing webpages of a web site. At 1001, the method begins. At 1005, a template generator is provided access to webpage source code. For example, a repository of webpage source code may be made available to the template generator, or the webpage generator may be provided with webpage source code by a webpage developer. At 1010, the template generator determines if a template representing a webpage exists, for example, in a library of templates.

If the template generator determines a template representing the webpage exists, at 1020, the template generator updates the template with any changes to the webpage source code associated with the webpage such that the template accurately represents the webpage. Then, at 1051, the method ends.

If the template generator determines a template representing the webpage does not exist, at 1030, the template generator generates a template representing the webpage. Subsequently, at 1035, the generated template is stored, for example, in a library of templates. Then, at 1051, the method ends.

The system described herein has the ability to mitigate testing challenges in large monolithic environments and code bases by maintaining environment node configuration data (setup scripts and prerequisite installation scripts) in source control and executing them on demand when triggered by a code change event. However, automating the creation of a virtual test environment is challenging, particularly when response time is important to returning test result to developers regarding a specific check-in. And while the operating system configuration and prerequisite packages are installed on demand according to version controlled specification, in practice this can take a long time depending on what prerequisites and configuration are required.

A test environment may include one or more virtual machines (VMs). For example, a VM in a test environment may be used to host a webpage to test changes to the webpage. A VM may be considered a software computer that runs an operating system and applications. VMs may be configured to functionally simulate physical information handling systems such as servers. A set of VMs in a test environment may thus simulate a system of devices, and test functions and functionality across multiple devices. In a test environment, a configured VM may be considered an environment node, and the test environment may include multiple environment nodes to simulate a system of devices.

For example, a test environment for a website may include multiple VMs interfacing with each other as environment nodes of the test environment. Different environment nodes, that is, different VMs in the test environment, may provide different testing functionality in the test environment and may interface with each other in the test environment. Thus in a test environment, an environment node may be configured to host a webpage and further environment nodes may be configured to interface with the webpage via the environment node hosting the webpage. For example, further environment nodes may be configured to run applications such as a SQL database, virtual shopping carts, or other webpages linked to the webpage such as a checkout webpage of a purchasing portal of a website.

A configuration of a VM may be captured by a snapshot, which is a file based representation of the state of the VM at a given time. A hypervisor may thereafter clone the VM, which is the process of copying the VM disk to a new storage location and starting up that new machine. Further configuration scripts may in turn be applied to the VM clone. For example a VM may be configured to represent a server with a single application and a single network connection, and its clone may be configured to represent that same server with two applications and multiple network connections.

Figure 11:
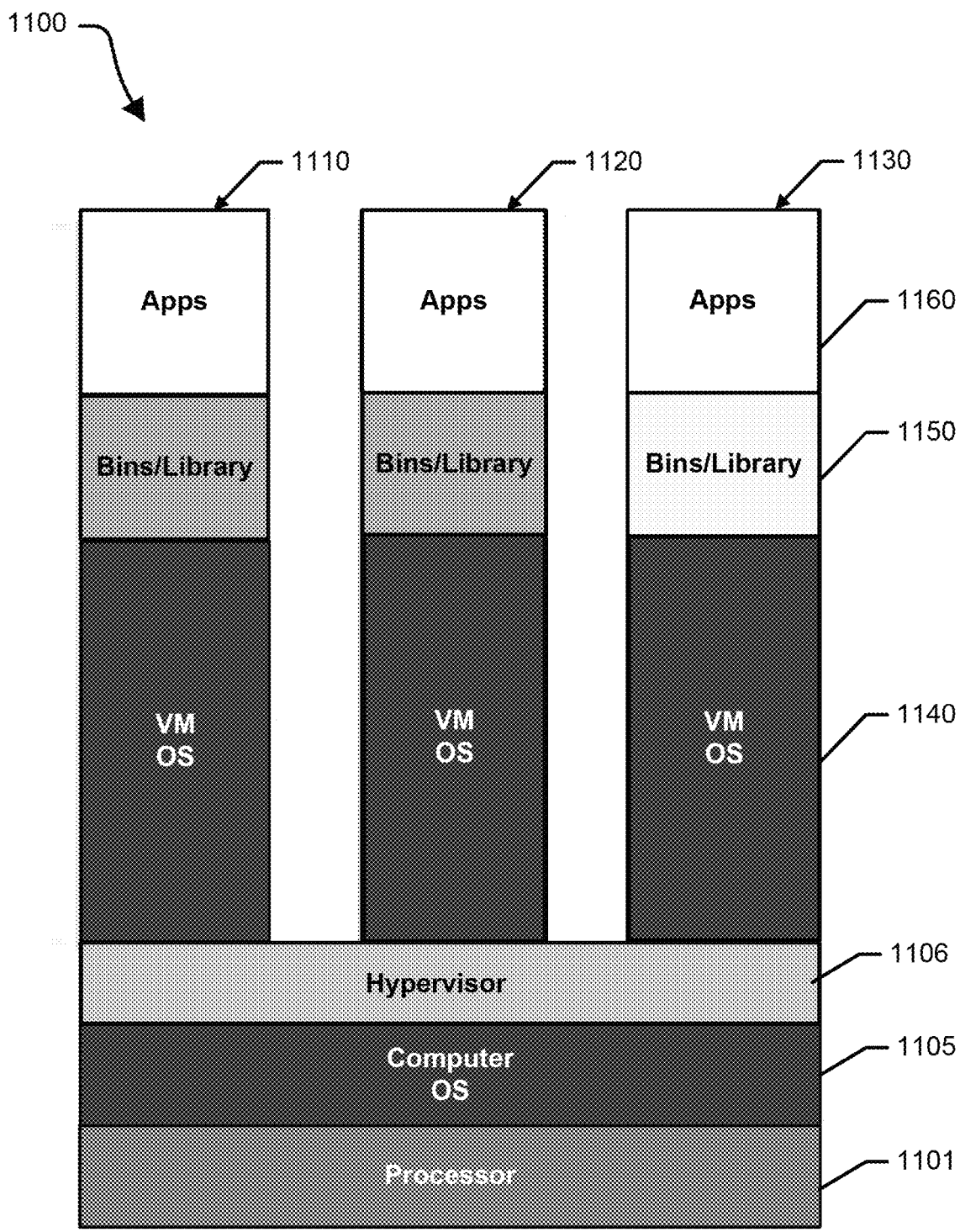
FIG. 11 is a diagrammatic representation of a system instantiating virtual machines.

FIG. 11 shows a system 1100 having a processor 1101 that supports a software stack including computer operating system 1105, hypervisor 1106, and VMs 1110, 1120 and 1130. Each VM includes an operating system 1140 supporting bins or libraries 1150 that in turn host applications 1160. In operation hypervisor 1106 may instantiate VM 1110, and then clone VM 1120 from a snapshot of VM 1110. Configuration changes to VM 1120 may also be captured and used to instantiate VM 1130.

Figure 12:
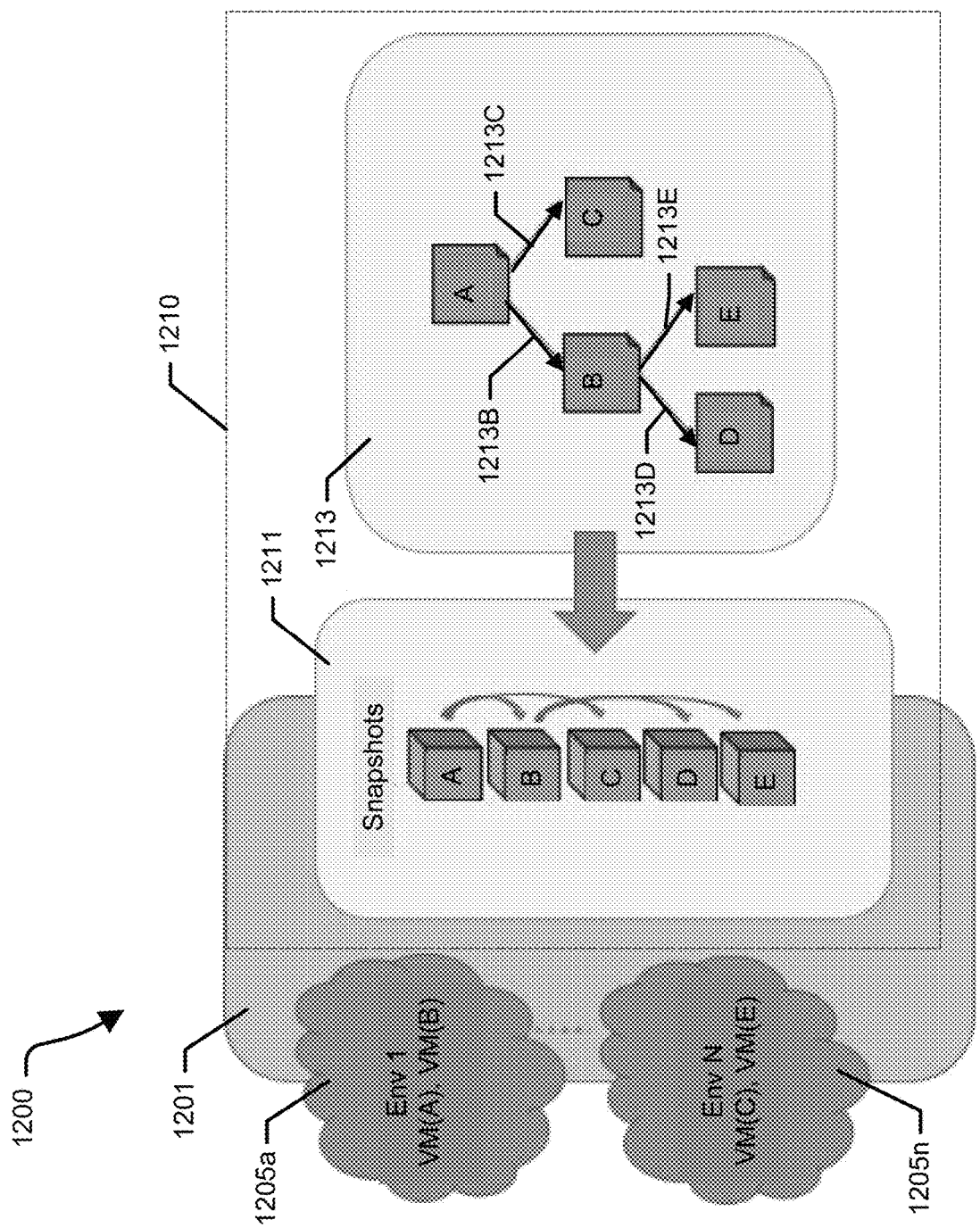
FIG. 12 is a diagrammatic representation of a virtual test environment system.
Figure 13:
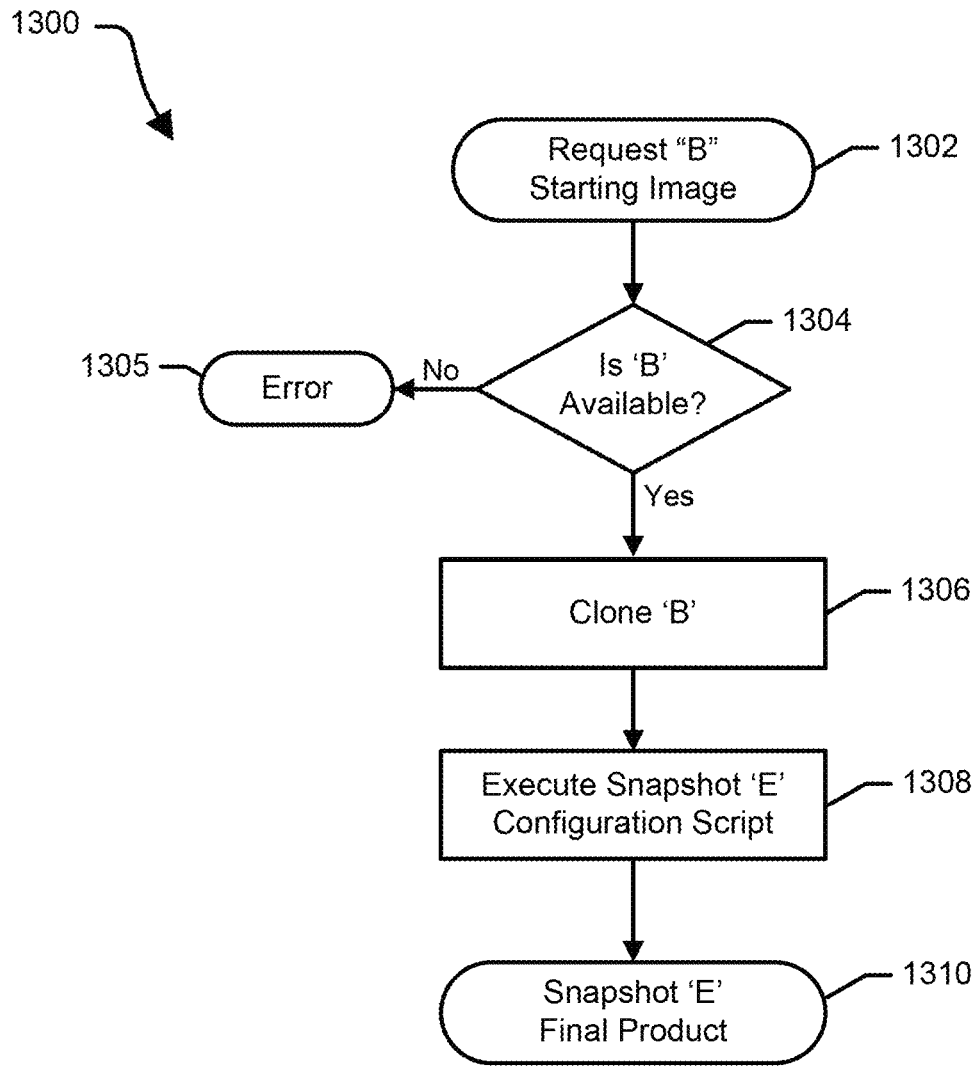
FIG. 13 is a flowchart of a method for building a snapshot.
Figure 14:
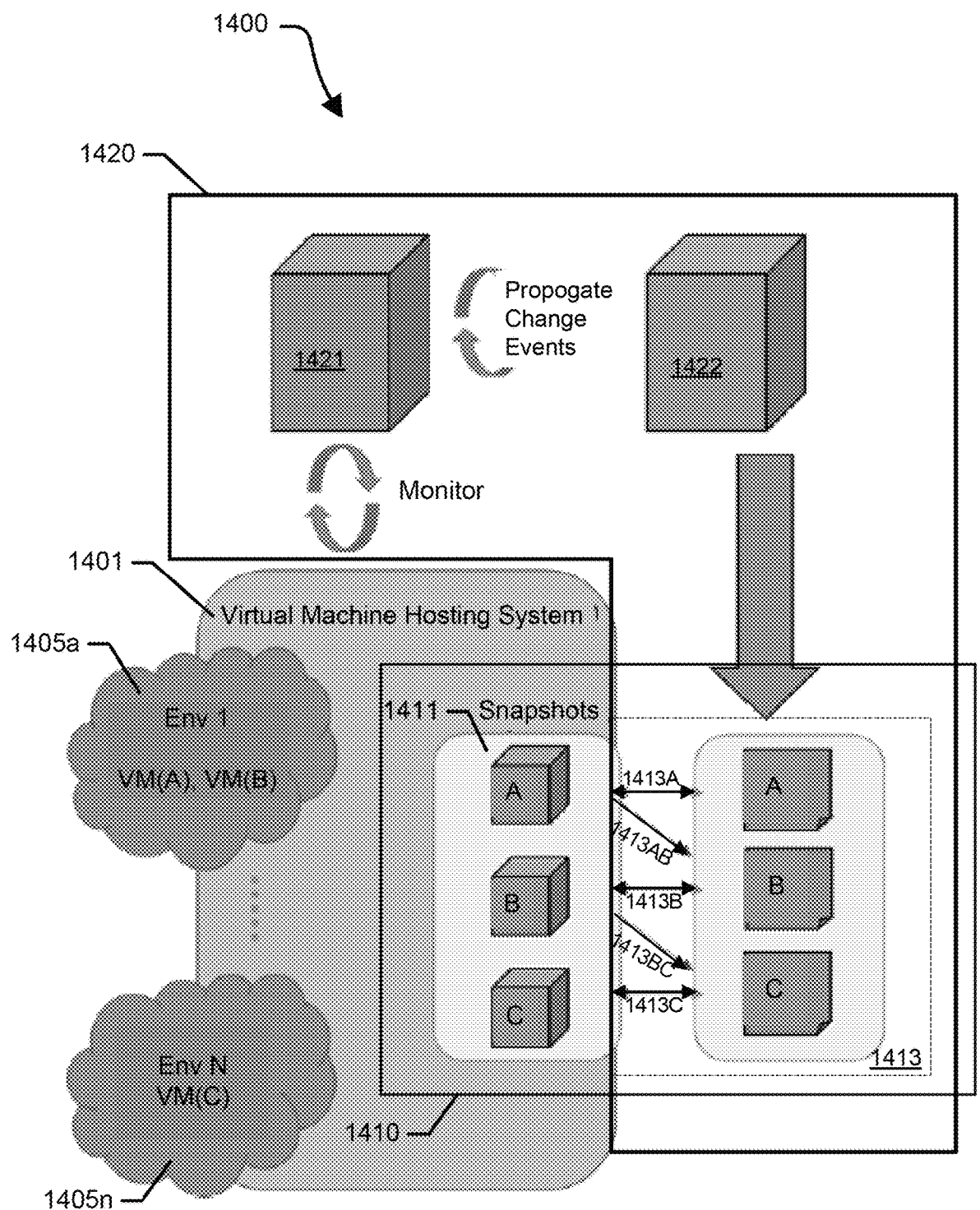
FIG. 14 is a diagrammatic representation of a system operable to instantiate virtual machines from snapshots of virtual machines.

FIGS. 12-14 illustrate systems and methodologies for optimally provisioning a VM test environment using a relational system of VM snapshots and correlated environment provisioning scripts. Environment node definitions of VMs in the system reference a configuration data script in a specified format. Provisioning of those nodes is accomplished by cloning of a snapshot that corresponds to the end-state configuration of the VM, post-execution of the corresponding configuration data script referenced by that environment node. Each environment node configuration definition consists of a reference to a base snapshot/environment node definition such as a starting point, and a body with executable commands. Permitting configuration data scripts to reference prior scripts allows for layering of the snapshots and configuration scripts for increased speed during changes to the configuration scripts.

Configuration scripts may install or uninstall applications on the VM instantiated from the snapshot, or may perform other operations such as patching an operating system running on the VM. Furthermore, configuration scripts applied to a VM may configure the VM to operate in different environments, such as different test environments.

FIG. 12 shows a test system 1200 including a test bench 1201 that supports and may host test environments 1205a-1205n with VMs. Test bench 1201 may host or interface with a repository 1210 stored in a memory. Repository 1210 may include a set 1211 of snapshots A-E representing states of VMs. VMs may be instantiated from snapshots A-E; hereinafter a VM instantiated from a snapshot X will be referred to as VM(X), and thus a VM instantiated from snapshot A will be indicated as VM(A). Repository 1210 may further include indications of scripts, configurations and VM relations as functionally shown by VM map 1213 which may show relations between snapshots A-E and corresponding VMs, configurations of snapshots A-E and corresponding VMs, and scripts applied to snapshots A-E and corresponding VMs.

Test environment 1205a hosts a set of VMs including VM(A) and VM(B), and test environment 1205n hosts a set of VMs including VM(C) and VM(E). Other test environments 1205 may each host or be associated with a set of VMs and these VMs may include one or more VMs derived from snapshots A-E. As shown by snapshot set 1211, snapshots B and C are derived or developed from snapshot A, and snapshots D and E are developed from snapshot B. VM(A) and VM(B) of test environment 1205a may be instantiated from snapshots A and B, respectively, by a hypervisor running on an information handling system hosting test environment 1205a. Similarly, VM(C) and VM(E) of test environment 1205n may be instantiated from snapshots C and E, respectively, by a hypervisor running on an information handling system hosting test environment 1205n.

VM map 1213 shows the relation between snapshots A-E. Thus snapshot B is derived from snapshot A by modifications 1213B, and snapshot C is derived from snapshot A by modifications 1213C. Similarly, snapshot D is derived from snapshot B by modifications 1213D, and snapshot E is derived from snapshot B by modifications 1213E. Modifications 1213B-1213E may be, for example, configuration scripts applied to VM(A) and VM(B) instantiated from snapshots A and B by a hypervisor.

For example, snapshot A may be a snapshot of a VM configured to be a server. Snapshots B and C represent different network server VMs developed by modifying VM(A) with modifications 1213B and 1213C, respectively, to provide further server details. Continuing with the server VM example, snapshots D and E may represent further network server VMs developed by modifying VM(B) with modifications 1213D and 1213E, respectively, to provide further server details. VM(B) and VM(C) could represent different second generation server models based on the server represented by VM(A), and VM(D) and VM(E) could represent different third generation server models based on the server represented by VM(B).

Repository 1210 may include a library storing snapshot set 1211 and the information of VM map 1213 including the relations between snapshots A-E such as modifications 1213B-1213E. In embodiments, snapshots A-E may be linked in the repository library such that a change to snapshot A is propagated to snapshots B-E and a change to snapshot B is propagated to snapshots D and E.

FIG. 13 shows an example method 1300 for building snapshot E of FIG. 12. Method 1300 begins at 1302 when a request is made for snapshot B as a starting image. For example, snapshot B may be accessed in repository 1210. At 1304 a decision is made whether snapshot B is available, for example if snapshot B exists in repository 1210 of FIG. 2. If not, an error message is returned at 1305. If snapshot B is available, then at 1306 a VM is instantiated from snapshot B by, for example, a hypervisor, thereby cloning VM(B). At 1308 modifications 1213E are applied to change the instantiated VM(B) clone from 1306 to VM(E). For example, one or more configuration scripts of 1213E may be applied to VM(B) clone to change the VM(B) clone to VM(E). The method ends at 1310 in which a snapshot is taken of VM(E)

and stored. For example, an image of VM(E) may be made and stored on disk in repository 1210.

The configuration script execution process preferably is tied to a continuous integration/continuous deployment (CI/CD) system so that changes to the configuration scripts are executed (and corresponding snapshots are produced) in real time along with changes to the scripts. As used herein, a CI/CD system is a development methodology reliant on producing, qualifying, and deploying builds and artifacts in real time as code is created by developers.

Layering scripts as described herein allows changes to be made at a more granular level and allows small scripts to be shared between different environment nodes. For example if one environment node requires a first computer programming language, and another environment node requires the first computer programming language and a second, alternate computer programming language, then the second node can reference the first node's script and simply add the extra steps for configuring the second language while leaving the first language setup scripts maintained in the same place instead of duplicated across two node configuration scripts.

FIG. 14 shows a test system 1400 augmented with CI/CD functionality. Test system 1400 includes a test bench 1401 that may be hosted on one or more information handling systems. Test system 1400 is augmented with an integration and deployment system 1420 in communication with test bench 1401. Test bench 1401 supports and may host test environments 1405a-1405n with VMs. Test bench 1401 may host or interface with a repository 1410 stored in a memory. Repository 1410 may include a snapshot set 1411 of snapshots A-C representing states of VMs. VMs may be instantiated from snapshots A-C; hereinafter a VM instantiated from a snapshot X or a VM having a snapshot X will be referred to as VM(X), and thus a VM corresponding to snapshot A will be indicated as VM(A). Repository 1410 may further include indications of scripts, configurations and VM relations as functionally shown by VM map 1413 which may show relations between snapshots A-C and corresponding VMs, configurations of snapshots A-C and corresponding VMs, and scripts applied to snapshots A-C and corresponding VMs. VM map 1413 includes representations A-C of snapshots A-C of snapshot set 1411.

Test environment 1405a hosts a set of VMs including VM(A) and VM(B), and test environment 1405n hosts a set of VMs including VM(C). Other test environments 1405 may each host or be associated with a set of VMs and these VMs may include one or more VMs derived from snapshots A-C. As shown, snapshot B is derived or developed from snapshot A and snapshot C is derived or developed from snapshot B. VM(A) and VM(B) of test environment 1405a may be instantiated from snapshots A and B, respectively, by a hypervisor running on an information handling system hosting test environment 1405a. Similarly, VM(C) test environment 1405n may be instantiated from snapshot C by a hypervisor running on an information handling system hosting test environment 1405n.

VM map 1413 shows the relation between snapshots A-C. Thus snapshot B is derived from snapshot A by modifications 1413AB, and snapshot C is derived from snapshot B by modifications 1413BC. Modifications may be, for example, configuration scripts applied to VM(A) and VM(B) instantiated from snapshots A and B by a hypervisor.

Test system 1400 is augmented with an integration and deployment system 1420 in communication with test bench 1401 and repository 1410. Integration and deployment system 1420 includes VM change monitor 1421 and VM change propagator 1422, and may also be considered to include VM map 1413 or aspects thereof of repository 1410. In operation, VM change monitor 1421 monitors instantiated VMs VM(A), VM(B) and VM(C) in test bench 1401. Should a VM, for example VM(A), be changed or modified in test bench 1401, VM change monitor 1421 will detect said change and propagate an indication of the change and the associated VM to VM change propagator 1422 as a change event. In turn, VM change propagator 1422 will propagate the change to VM map 1413 and snapshots 1411 will be updated accordingly.

More particularly, building upon the example change to VM(A), VM change monitor 1421 detects the change to VM(A) with monitoring and propagates the change to VM change propagator 1422 as a change event with regard to snapshot A in repository 1410. In response VM change propagator 1422 propagates the change to representation A in VM map 1413. The change of VM(A) is propagated from representation A in VM Map 1413 to snapshot A of snapshot set 1411 by 1413A which represents the change in VM map 1413. Because snapshots B and C are derived from snapshot A, the change to snapshot A is propagated to representation B of VM map 1413 by 1413AB as shown. The change to snapshot A is propagated from representation B of VM map 1413 to snapshot B of snapshot set 1411 by 1413B. The change to snapshot A is further propagated from snapshot B of snapshot set 1411 to representation C of VM map 1413 by 1413BC as shown, and then from representation C of VM map 1413 to snapshot C of snapshot set 1411.

Therefore, integration and deployment system 1420 provides for a change to a VM in test bench 1401 and test environments 1405a-1405n to be propagated across related or derived snapshots in snapshot set 1411 in repository 1410. Integration and deployment system 1420 may be continuously run to dynamically update changes to VMs in corresponding VM snapshots such that VM snapshots are current with changes or modifications to related VMs.

Cloning new VMs from a known good snapshot may cut new node provisioning time down significantly compared to a green node configuration script for a VM. This time savings allows significantly more test cycles per workday for a development team. A layered VM configuration scheme as described also reduces maintenance cost of the VM configuration scripts, reducing defects and increasing maintainability in the above system.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A system comprising a computer processor for testing changes to a website, the system comprising:
a monitoring component to monitor for changes in a web site, and to detect a change in the web site;
a repository; and
a hypervisor communicatively connected to the repository and to the monitoring component, in response to the detection of the change in the website the hypervisor to instantiate a virtual test environment, within the virtual test environment the hypervisor configured to:
instantiate a first virtual machine, from a first snapshot stored in the repository, as a first environment node in a test environment;
apply scripts to configure the first virtual machine to test a first proposed webpage of the website;
if the test is successful, then store in the repository a second snapshot of the first virtual machine as configured;
instantiate a second virtual machine, from the second snapshot, as a second environment node;
configure the second virtual machine to test a second webpage of the website; and
test an interface between the first virtual machine and the second virtual machine to test an interface between the second webpage of the website and the first proposed webpage.

2. The system of claim 1 wherein the hypervisor is further configured to:
instantiate a third virtual machine, and install an application on the third virtual machine to interface with the second webpage.

3. The system of claim 2 wherein the application is a database.

4. The system of claim 1 wherein the second webpage is a virtual shopping cart.

5. The system of claim 1 wherein the scripts patch an operating system of the first virtual machine.

6. The system of claim 1 wherein the scripts install a new application on the first virtual machine.

7. The system of claim 1 wherein scripts uninstall an old application from the first virtual machine.

8. A method comprising:
monitoring for changes in a website;
detecting a change in the website; and
in response to the detecting of the change in the website, instantiating a virtual test environment, within the virtual test environment:
storing in memory a snapshot of a first virtual machine, wherein the first virtual machine is a first environment node in a test environment, and the first environment node hosts a first proposed webpage of a web site;
instantiating a second virtual machine from the first virtual machine snapshot;
configuring the second virtual machine as a second environment node in the test environment, the second environment node hosting a second webpage of the website;
testing an interface between the first virtual machine and the second virtual machine to utilize a hyperlink from the first proposed webpage to the second webpage to test connections between the second webpage and the first proposed webpage, wherein the test of the connections is a test of an interface between the second webpage of the website and the first proposed webpage linked to the second webpage; and
storing in memory a snapshot of the second environment node.

9. The method of claim 8 further comprising instantiating a third virtual machine, and installing an application on the third virtual machine to interface with the second webpage.

10. The method of claim 9 wherein the application is a database.

11. The method of claim 10 wherein the second webpage is a virtual shopping cart.

12. The method of claim 8 wherein the configuring includes patching an operating system of the second virtual machine.

13. The method of claim 8 wherein the configuring includes installing a new application on the first virtual machine.

14. The method of claim 8 wherein the configuring includes uninstalling an old application from the first virtual machine.

15. A system comprising a computer processor for testing changes to a website, the system comprising:
a monitoring component to monitor for changes in a web site, and to detect a change in the website;
a hypervisor, in response to the detection of the change in the website, the hypervisor to instantiate a virtual test environment;
within the virtual test environment, a first virtual machine configured as a first node in a test environment to test a first proposed webpage of a website;
within the virtual test environment, a second virtual machine configured from a snapshot of the first virtual machine as configured, the second virtual machine being further configured as a second node in the test environment to test a second webpage of the website, wherein the second virtual machine interfaces with the first virtual machine within the test environment to utilize a hyperlink from the first proposed webpage to the second webpage to test connections between the second webpage and the first proposed webpage, wherein the test of the connections is a test of an interface between the first proposed webpage and the second webpage; and within the virtual test environment, a third virtual machine having an application to interface with the second webpage.

16. The system of claim 15 wherein the application is a database.

17. The system of claim 15 wherein the application is a SQL database.

18. The system of claim 15 wherein the second webpage is a virtual shopping cart.

19. The system of claim 15 wherein the second webpage represent a checkout webpage.

* * * * *